Y. D. Anderson,
Boiler Feeder.
No. 103,539.  Patented May 31, 1870.

Witnesses:  
A. W. Almquist  
L. S. Mabee

Inventor:  
Y. D. Anderson  
per Munn & Co  
Attorneys.

UNITED STATES PATENT OFFICE.

VALERIUS D. ANDERSON, OF KEWANEE, ILLINOIS.

BOILER-FEEDER AND LOW-WATER ALARM.

Specification forming part of Letters Patent No. 103,539, dated May 31, 1870.

*To all whom it may concern:*

Be it known that I, VALERIUS D. ANDERSON, of Kewanee, in the county of Henry and State of Illinois, have invented a new and useful Improvement in Automatic Boiler-Feeder; and I do hereby declare that the following is a full, clear, and exact description thereof, which will enable others skilled in the art to make and use the same, reference being had to the accompanying drawing, forming part of this specification.

Figure 1:
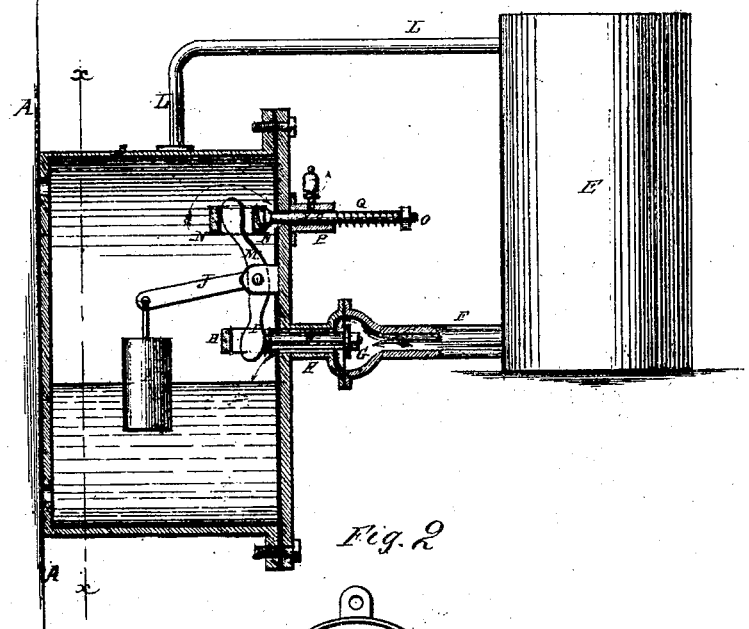
Figure 2:
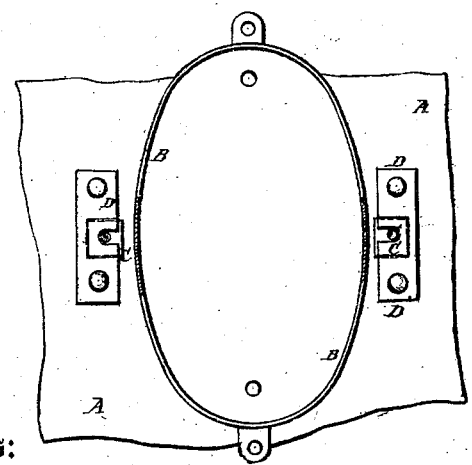

Figure 1 is a detail sectional view of my improved boiler-feeder. Fig. 2 is a view of the feeder, the cap-plate being removed, and partly in section through the line $x\,x$, Fig. 1, to show the manner of its attachment to the boiler.

Similar letters of reference indicate corresponding parts.

My invention has for its object to furnish an improved automatic feeder for steam-boilers used for warming buildings, steaming feed for stock, and other uses where a low pressure of steam is required; and it consists in the construction and combination of the various parts of the feeder, as hereinafter more fully described.

A represents the shell of a steam-boiler. B is the feeder, which is made of any convenient form, and which is secured to the upper part of the boiler A by the bolts C in such a position that its upper part may be above and its lower part below the water-line of said boiler. D are flanges formed upon or securely bolted to the side of the upper part of the boiler A in such positions and at such a distance apart that the feeder B may be received between them. In the inner edges of the flanges D are formed transverse slots to secure the bodies of the bolts C, the heads of said bolts slipping beneath the said flanges, as shown in Fig. 2. The bolts C pass through lugs formed upon the outer part of the feeder B, and have nuts placed upon their outer ends to securely clamp the feeder B to the boiler A.

The feeder B is made with a close inner end, through which are formed two holes, one above and one below the water-line of the boiler, and which correspond with two similar holes formed in the side of the boiler A.

By this construction the water from the boiler A will pass into the feeder B through the lower of said holes, and the steam from said boiler will pass into said feeder through the upper hole, so that the water will stand at the same level in feeder and boiler, and the steam-pressure will be the same in both.

E is a water-reservoir, which is placed at a higher level than the feeder B. The lower part of the reservoir E is connected by a pipe, F, with the outer end plate of the feeder B, which end plate is secured to the body of the feeder by bolts passing through lugs formed upon the edge of the said plate and the sides of said feeder, as shown in Fig. 1.

The pipe F has an enlargement formed upon it, in which is placed a valve, G, the stem H of which projects into the feeder B, and its inner end is slotted to receive the lower end of the cross-arm I of the lever J, which is pivoted to the inner side of the detachable end plate of the feeder at the point of attachment of the said cross-arms I.

To the inner end of the lever J is pivoted a float, K, which floats upon the water in the feeder B, and rises and falls with the rise and fall of the said water. By this construction, when the water falls in the boiler and feeder, the weight K falls and operates the lever J I to push the valve-stem H outward, opening the valve G and allowing the water from the reservoir E to flow through the pipe F into the feeder B, whence it flows into the boiler A. As the water rises in the feeder and boiler the weight K is raised and the valve G is again closed, shutting off the entrance of the water.

The upper part of the reservoir E is connected with the upper part or steam-space of the feeder B by a pipe, L, through which the steam passes freely to the upper part of the said reservoir E, so that the water may flow out of the said reservoir freely when the valve G is opened.

M is the upper cross-arm of the lever J, the upper end of which enters and works in a slot in the inwardly-projecting end of the valve N, which fits into a valve-seat in the inner side of the outer part of the outer end plate of the feeder B.

The stem O of the valve N passes out through the said end plate, and through a small pipe, P, attached to the outer side of said end plate, and provided with a discharge-orifice or whistle for the noisy escape of the steam; and upon the outer or projecting part of said stem is placed a coiled spring, Q, the inner end of which rests against the outer end of said pipe, and the outer end of which rests against a nut or other stop attached to the outer end of the said valve-stem O.

The slot in the inner part of the valve N is made longer than the slot in the valve-stem H, so that the valve G may be operated to admit the water before the valve N is operated to sound an alarm, said alarm not being sounded unless the water in the boiler falls lower than it should by the failure of the water in the tank or reservoir E, the stopping or clogging of the pipe F, or some other cause rendering the attention of the engineer necessary.

Having thus described my invention, I claim as new and desire to secure by Letters Patent—

1. Securing the feeder B to the side of the boiler A detachably by means of the long bolts C and slotted flanges D, substantially as herein shown and described, and for the purpose set forth.

2. The combination of the feeder B, steam-pipe L, reservoir E, pipe F, valve G, having the inner end of its stem H slotted, cross-arm I, levers J, and float K with each other, to adapt them for attachment to a low-pressure steam-boiler, substantially as herein shown and described, and for the purpose set forth.

3. The combination of the feeder B, steam-pipe L, reservoir E, pipe F, valve G, having the inner end of its stem H slotted, cross-arm I, levers J, float K, cross-arm M, valve N, having its inner end slotted, valve-stem O, and spring Q with each other, substantially as herein shown and described, and for the purpose set forth.

VALERIUS D. ANDERSON.

Witnesses:
EGBERT E. SLOCUM,
JAS. A. LYON.